US007740788B2

(12) United States Patent
Yoshino et al.

(10) Patent No.: US 7,740,788 B2
(45) Date of Patent: Jun. 22, 2010

(54) METHOD OF CORRECTING SHAPE OF GREEN TIRE AND APPARATUS FOR CARRYING OUT THE SAME

(75) Inventors: Toshikatsu Yoshino, Tosu (JP); Tsuyoshi Imaizumi, Tosu (JP)

(73) Assignee: Bridgestone Corporation, Tokyo (JP)

( * ) Notice: Subject to any disclaimer, the term of this patent is extended or adjusted under 35 U.S.C. 154(b) by 834 days.

(21) Appl. No.: 10/578,712

(22) PCT Filed: Nov. 11, 2004

(86) PCT No.: PCT/JP2004/016736

§ 371 (c)(1), (2), (4) Date: Jan. 10, 2007

(87) PCT Pub. No.: WO2005/046975

PCT Pub. Date: May 26, 2005

(65) Prior Publication Data
US 2007/0170620 A1 Jul. 26, 2007

(30) Foreign Application Priority Data
Nov. 12, 2003 (JP) ............................ 2003-382236

(51) Int. Cl.
  *B29C 35/00* (2006.01)
  *B29D 30/00* (2006.01)
  *B29D 30/06* (2006.01)
(52) U.S. Cl. .................... 264/326; 264/501; 425/35; 425/36; 425/38
(58) Field of Classification Search .............. 425/35, 425/36, 38; 264/326, 501, 502
See application file for complete search history.

(56) References Cited

U.S. PATENT DOCUMENTS

| 3,380,115 A | 4/1968 | Soderquist |
| 3,824,048 A | 7/1974 | Getz |

(Continued)

FOREIGN PATENT DOCUMENTS

| JP | 46-24773 B1 | 7/1971 |
| JP | 58-18724 | 2/1983 |

(Continued)

OTHER PUBLICATIONS

European Search Report dated Jan. 24, 2008.

*Primary Examiner*—Joseph S Del Sole
*Assistant Examiner*—Robert Dye
(74) *Attorney, Agent, or Firm*—Sughrue Mion, PLLC

(57) ABSTRACT

The shapes of the upper tire bead Bu and the lower tire bead Bl of a green tire G and the axial distance between the tire beads Bu and Bl are corrected in a short work time. The green tire G is placed in horizontal attitude on a green tire support table 3 provided with a lower tire bead correcting unit 10. Radially movable pressing members 13 included in the lower tire bead correcting unit 10 are engaged with the inner side of the lower tire bead Bl of the green tire G and stoppers 29 of the upper tire bead correcting unit 20 are engaged with the inner side of the upper tire bead Bu of the green tire G placed on the green tire support table 3. The pressing members 13 of the lower tire bead correcting unit 10 are moved radially outward to shape the lower tire bead Bl into a completely round shape of a predetermined diameter. The stoppers 29 of the upper tire bead correcting unit 20 are moved radially outward to shape the upper tire bead Bu into a completely round shape of a predetermined diameter and, at substantially the same time, the upper tire bead correcting unit 20 or the lower tire bead correcting unit 10 is moved vertically to adjust the axial distance B between the tire beads Bu and Bl to a predetermined axial bead spacing.

13 Claims, 6 Drawing Sheets

U.S. PATENT DOCUMENTS

| | | |
|---|---|---|
| 4,268,219 A | 5/1981 | Nakagawa et al. |
| 4,600,370 A | 7/1986 | Kaneko et al. |
| 4,768,764 A | 9/1988 | Cole |
| 5,395,150 A | 3/1995 | Imler et al. |
| 5,830,513 A | 11/1998 | Fukuda |
| 6,615,649 B1 | 9/2003 | Kokubu et al. |

FOREIGN PATENT DOCUMENTS

| | | |
|---|---|---|
| JP | 59-81156 A | 5/1984 |
| JP | 60-264209 A | 12/1985 |
| JP | 60-264236 A | 12/1985 |
| JP | 2002-079589 A | 3/2002 |

METHOD OF CORRECTING SHAPE OF GREEN TIRE AND APPARATUS FOR CARRYING OUT THE SAME

TECHNICAL FIELD

The present invention relates to a method of correcting the shape of a green tire and an apparatus for carrying out the shape correcting method.

BACKGROUND ART

The tire beads of a green tire, prior to vulcanization, formed by a tire molding step of a tire manufacturing process are liable to deform due to conditions of storage and temperature difference between the green tire and the ambient air. When a hanger-type carriage is used for storing and carrying green tires, the tire beads expected to be completely round are deformed in an elliptic shape by their own weight.

A vulcanized tire obtained by vulcanizing the deformed green tire is unsatisfactory in quality represented by uniformity and balance and a vulcanized tire of a satisfactory quality cannot be produced.

A tire shape correcting and holding device is proposed in Patent document 1 (JP 2002-79589 A). This tire shape correcting and holding device has a pair of upper and lower arcuate shaping plates divided into a plurality of segments. The pair of arcuate shaping plates are inserted in a green tire to be subjected to a vulcanizing process. The pair of shaping plates are pressed against the axially opposite upper and lower tire beads of a green tire and are expanded to correct the deformed tire beads and to shape the tire beads into a completely round shape.

The pair of shaping plates of the shape correcting and holding device proposed in Patent document 1 are expanded to press the upper and lower tire beads radially outward to shape the tire beads in a completely round shape. The corrected green tire held by the shape correcting and holding device is sent to a vulcanizer.

DISCLOSURE OF THE INVENTION

Problem to be Solved by the Invention

The shape correcting and holding device can correct the shape of the upper and lower tire beads in a completely round shape but cannot adjust the axial distance between the axially opposite tire beads (axial bead spacing). If the axial bead spacing of the green tire is greatly different from the standard axial bead spacing, the quality of a vulcanized tire obtained by vulcanizing the green tire is unsatisfactory.

The present invention has been made in view of such a problem and it is therefore an object of the present invention to provide a shape correcting method capable of correcting the shape of the axially opposite tire beads of a green tire and of correcting the axial distance between the opposite tire beads and to provide a shape correcting apparatus for carrying out the shape correcting method.

Means for Solving the Problem

The method of correcting the shape of a green tire according to the present invention includes the steps of: placing the green tire on a green tire support table provided with a lower tire bead correcting unit at a predetermined position in horizontal attitude so as to surround the lower tire bead correcting unit; engaging a plurality of radially movable pressing members included in the lower tire bead correcting unit and arranged on a circle coaxial with the lower tire bead correcting unit with a lower tire bead of the green tire placed on the green tire support table; inserting an upper tire bead correcting unit inside an upper tire bead of the green tire placed on the green tire support table; engaging a plurality of radially movable pressing members included in the upper tire bead correcting unit and arranged on a circle coaxial with the upper tire bead correcting unit with the upper tire bead of the green tire placed on the green tire support table; moving the plurality of pressing members included in the lower tire bead correcting unit radially outward to shape the lower tire bead into a completely round shape of a predetermined diameter; moving the plurality of pressing members included in the upper tire bead correcting unit radially outward to shape the upper tire bead into a completely round shape of a predetermined diameter; and vertically moving at least either of the lower and the upper tire bead correcting unit relative to the other to adjust an axial distance between the upper and the lower tire bead to a predetermined axial bead spacing.

The lower tire bead correcting unit holds the lower tire bead of the green tire by the plurality of pressing members and presses the lower tire bead radially outward to shape the lower tire bead into a completely round shape of the pre-determined diameter, the upper tire bead correcting unit holds the upper tire bead of the green tire by the plurality of pressing members and presses the upper tire bead radially outward to shape the upper tire bead into a completely round shape of the predetermined diameter, and at least the lower tire bead correcting unit (or the upper tire bead correcting unit) moves vertically relative to the upper tire bead correcting unit (or the lower tire bead correcting unit) to adjust the axial distance between the upper and the lower tire bead to the predetermined axial bead spacing. Thus the upper and the lower tire bead of the green tire can be shaped in a completely round shape of the predetermined diameter and the axial distance between the upper and the lower tire bead can be adjusted in a short work time. Consequently, a vulcanized tire of a satisfactory quality can be produced by vulcanizing the green tire.

The upper tire bead correcting unit can be placed inside the green tire placed on the green tire support table by turning and vertically moving the upper tire bead correcting unit.

The present invention also provides a shape correcting apparatus for correcting the shape of a green tire, which comprises: a green tire support table for supporting a green tire thereon in horizontal attitude; a lower tire bead correcting unit including a plurality of radially movable first pressing members placed on the green tire support table on a circle coaxial with the green tire support table and a first pressing member moving means for pressing a lower tire bead of the green tire radially outward by moving the first pressing members radially outward to shape the lower tire bead in a completely round shape of a predetermined diameter; an upper tire bead correcting unit including a plurality of radially movable second pressing members arranged on a circle and a second pressing member moving means for pressing an upper tire bead of the green tire placed on the green tire support table radially outward by moving the second pressing members radially outward to shape the upper tire bead in a completely round shape of a predetermined diameter; and a lifting means for vertically moving at least either of the lower and the upper tire bead correcting unit relative to the other to adjust the axial distance between the upper and the lower tire bead to a predetermined axial bead spacing.

The lower tire bead correcting unit for correcting the shape of the lower tire bead by pressing the lower tire bead radially outward by the plurality of first pressing members, and the upper tire bead correcting unit for correcting the shape of the upper tire bead by pressing the upper tire bead radially outward by the plurality of second pressing members are installed individually, and at least either of the upper and the lower tire bead correcting unit is moved vertically relative to the other to adjust the axial distance between the upper and the lower tire bead to the predetermined axial bead spacing. Thus the upper and the lower tire bead of the green tire can be shaped in a completely round shape of the predetermined diameter and the axial distance between the upper and the lower tire bead can be adjusted in a short work time. Consequently, a vulcanized tire of a satisfactory quality can be produced by vulcanizing the green tire.

REFERENCE SIGNS

G . . . Green tire,
1 . . . Vulcanizer, 2 . . . Swivel support device, 3 . . . Green tire support table, 5 . . . vertical loader, 6 . . . Pivot, 7 . . . Swing bar,
10 . . . Lower tire bead correcting unit, 11 . . . Guide member, 12 . . . Sliding bar, 13 . . . Pressing member, 15 . . . Support bridge, 16 . . . Rotary actuator, 17 . . . Drive shaft, 18 . . . Cam disk, 19 . . . Air supply pipe,
20 . . . Upper tire bead correcting unit, 21 . . . Upper disk, 22 . . . Center shaft, 23 . . . Lower disk, 24 . . . Rotary ring, 25 . . . Guide member, 26 . . . Sliding bar, 27 . . . Cylindrical segment, 28 . . . Flange, 29 . . . Stopper,
30 . . . Pivotal pin, 31 . . . Lever, 32 . . . Pin, 33 . . . Pin, 50 . . . Lower tire bead correcting unit, 51 . . . Guide member, 52 . . . Sliding bar, 53 . . . Pressing member, 55 . . . Inner cylinder, 56 . . . Outer cylinder, 57 . . . Closing member, 58, 59 . . . Linear bearings, 60 . . . Spring, 61 . . . Exhaust pipe, 62 . . . Blanket, 63 . . . Pin, 64 . . . Arm, 65 . . . Pin, 70 . . . Green tire support plate.

BEST MODE FOR CARRYING OUT THE INVENTION

A shape correcting apparatus in a first embodiment of the present invention will be described with reference to FIGS. 1 to 6.

Figure 1:
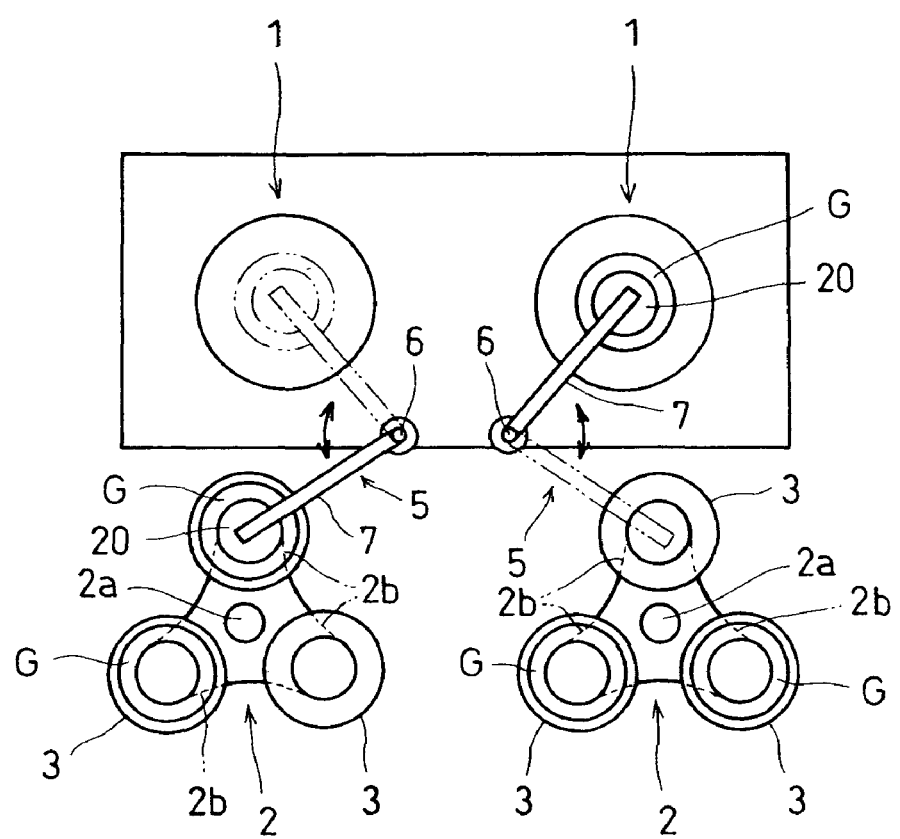
FIG. 1 is a schematic plan view of a shape correcting apparatus in a first embodiment of the present invention for correcting the shape of a green tire and for feeding a correctly shaped green tire to a vulcanizer.

A shape correcting apparatus in a first embodiment of the invention for correcting the shape of a green tire G is used in a green tire feed process for feeding a green tire G to a vulcanizer 1. FIG. 1 shows a pair of vulcanizers 1 and the associated devices schematically.

Referring to FIG. 1, swivel support device 2 are disposed at green tire feed positions in front of the vulcanizers 1, respectively. Each of the swivel support devices 2 has a center shaft 2a, swing arms 2b radially extending from the center shaft 2a, and circular green tire support tables 3 supported respectively on free end parts of the swing arms 2b.

Green tires G are mounted on the green tire support tables 3 and are held thereon until the green tires G are fed to the vulcanizer 1. The swing arms 2b of the swivel support device 2 are turned to locate one of the green tires G supported on the green tire support tables 3 close to the vulcanizer 1. A vertical loader 5 feeds the green tire G located close to each vulcanizer 1 to the same.

Each of the vertical loader 5 has a vertically stretchable rotary shaft 6 and a swing bar 7 horizontally extending from the rotary shaft 6. An upper tire bead correcting unit 20 serving also as a tire gripping mechanism is suspended from the free end part of the swing bar 7. The upper tire bead correcting unit 20 grips the green tire G mounted on the green tire support plate 3 located close to the vulcanizer 1. Then, the vertical loader 5 lifts up the green tire G and turns to transfer the green tire G to the vulcanizer 1.

The shape correcting apparatus includes, in addition to the upper tire bead correcting units, lower tire bead correcting units 10 respectively mounted on the green tire support tables 3 of the swivel support device 2, and the vertical loader 5.

Figure 2:
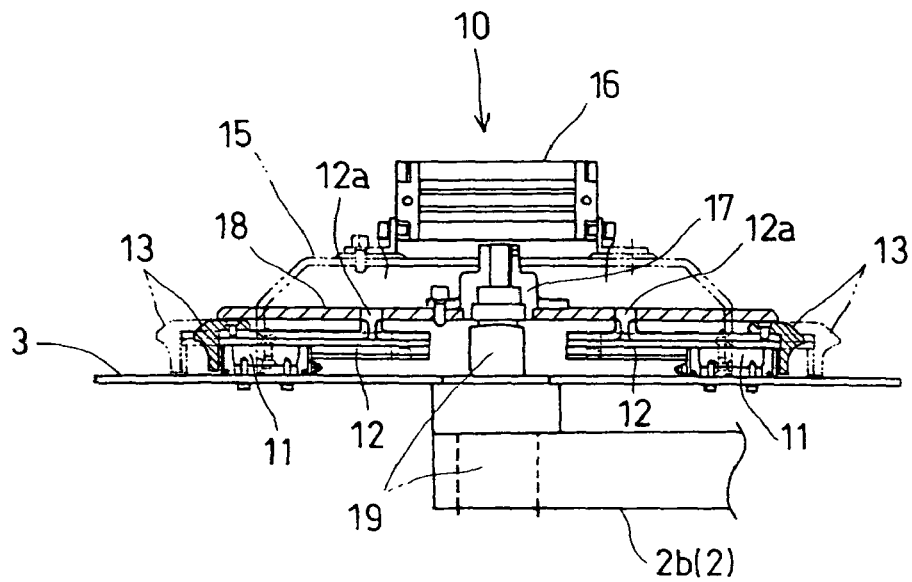
FIG. 2 is a partly sectional side elevation of a lower tire bead correcting unit.
Figure 3:
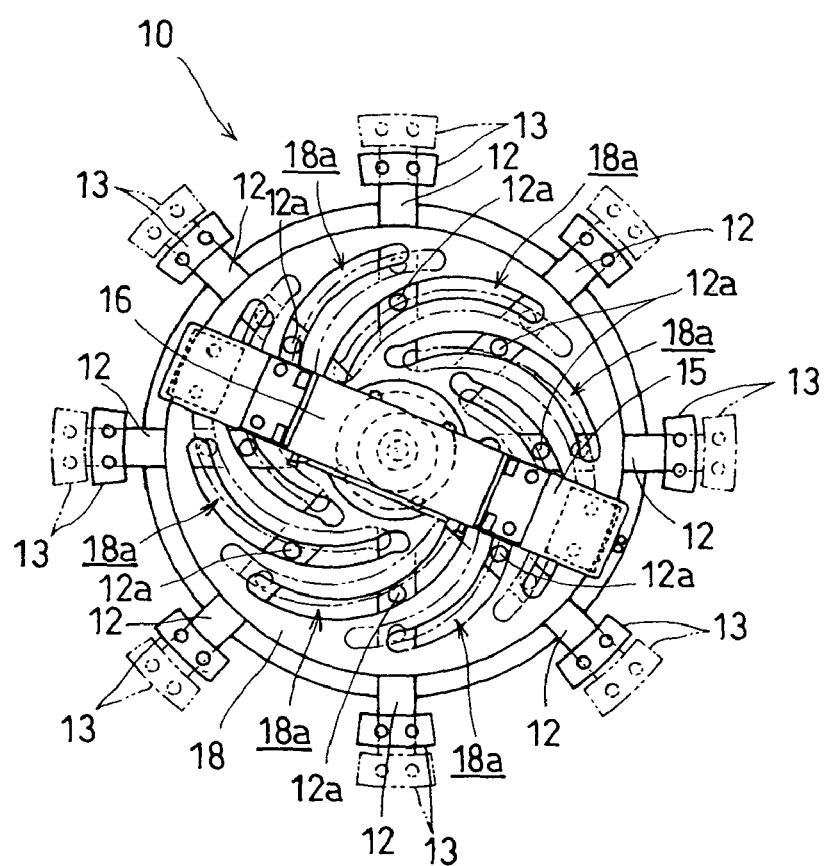
FIG. 3 is a top view of the lower tire bead correcting unit shown in FIG. 2.

Referring to FIGS. 2 and 3, each of the lower tire bead correcting unit 10 mounted on the green tire support table 3 includes guide member 11 arranged at equal angular intervals so as to extend radially and fixed to the green tire support table 3 and, for example, eight sliding bars 12 guided by the guide members 11 for radial sliding movement. Pressing members 13 are attached to the radially outer ends of the sliding bars 12, respectively. The pressing members 13 have a shape resembling a circular arc in plan view and an L-shaped cross section. The pressing members 13 can be moved radially outward to bring the pressing members 13 into engagement with the inner side of a lower tire bead Bl.

A support bridge 15 is extended between posts disposed symmetrically with respect to the center axis of the lower tire bead correcting unit 10 at positions not coinciding with the sliding bars 12. A pneumatic rotary actuator 16 having a vertical drive shaft 17 is mounted on a middle part of the support bridge 15.

A cam disk 18 in horizontal attitude having the shape of a circular plate is attached to the drive shaft 17 projecting vertically downward from the support bridge 15. The cam disk 18 is turnable above the eight sliding bars 12.

As shown in FIG. 3, the cam disk 18 is provided with eight spiral slots 18a arranged at equal intervals. Pins 12a projecting from the upper surfaces of the eight sliding bars 12 are engaged slidably in the eight spiral slots 18a, respectively.

When the rotary actuator 16 turns the cam disk 18, the pins 12a engaged in the spiral slots 18a are moved to move the eight sliding bars 12 in unison in radial directions.

The lower tire bead correcting unit 10 is designed such that the eight sliding bars 12 are always at the same radial distance from the center of the cam disk 18 of the lower tire bead correcting unit 10. Therefore, the eight pressing members 13 attached to the radially outer ends of the sliding bars 12 are always on one and the same circle having its center at the center of the lower tire bead correcting unit 10. The diameter of the circle on which the eight pressing members 13 are arranged changes as the eight pressing members 13 are moved in unison in radial directions.

An air passage is formed in the drive shaft 17 extending vertically downward of the rotary actuator 16 along the axis of the drive shaft 17. An air supply pipe 19 is extended upward through a central part of the green tire support plate 3 and is connected to the air passage of the drive shaft 17. Compressed air is supplied through the air passage of the drive shaft 17 to the rotary actuator 16.

The rotary actuator 16 and the cam disk 18 constitute a sliding bar driving mechanism (sliding bar driving means) for driving the sliding bars 12. The rotary actuator 16, the cam disk 18 and the sliding bars 12 also constitute a first pressing member moving mechanism (first pressing member moving means).

Figure 4:
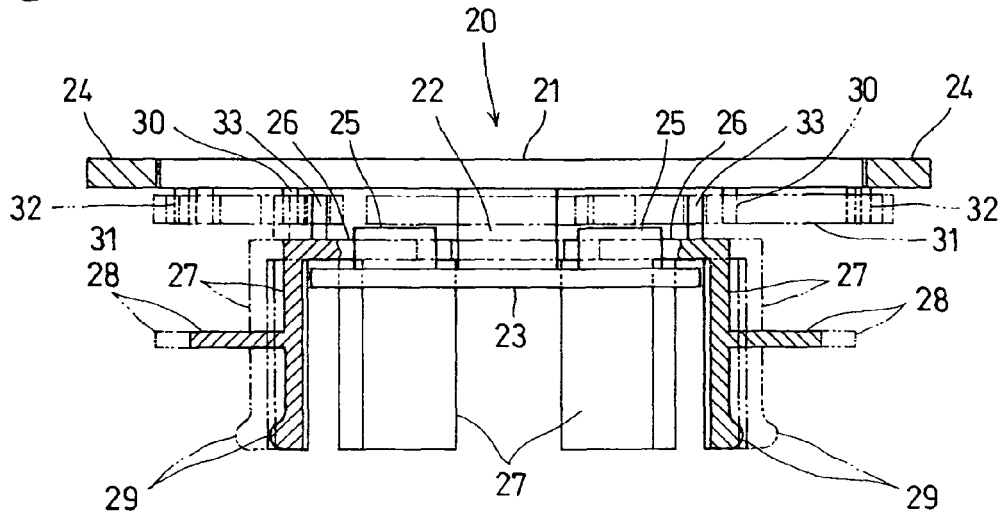
FIG. 4 is a partly sectional side elevation of an upper tire bead correcting unit.
Figure 5:
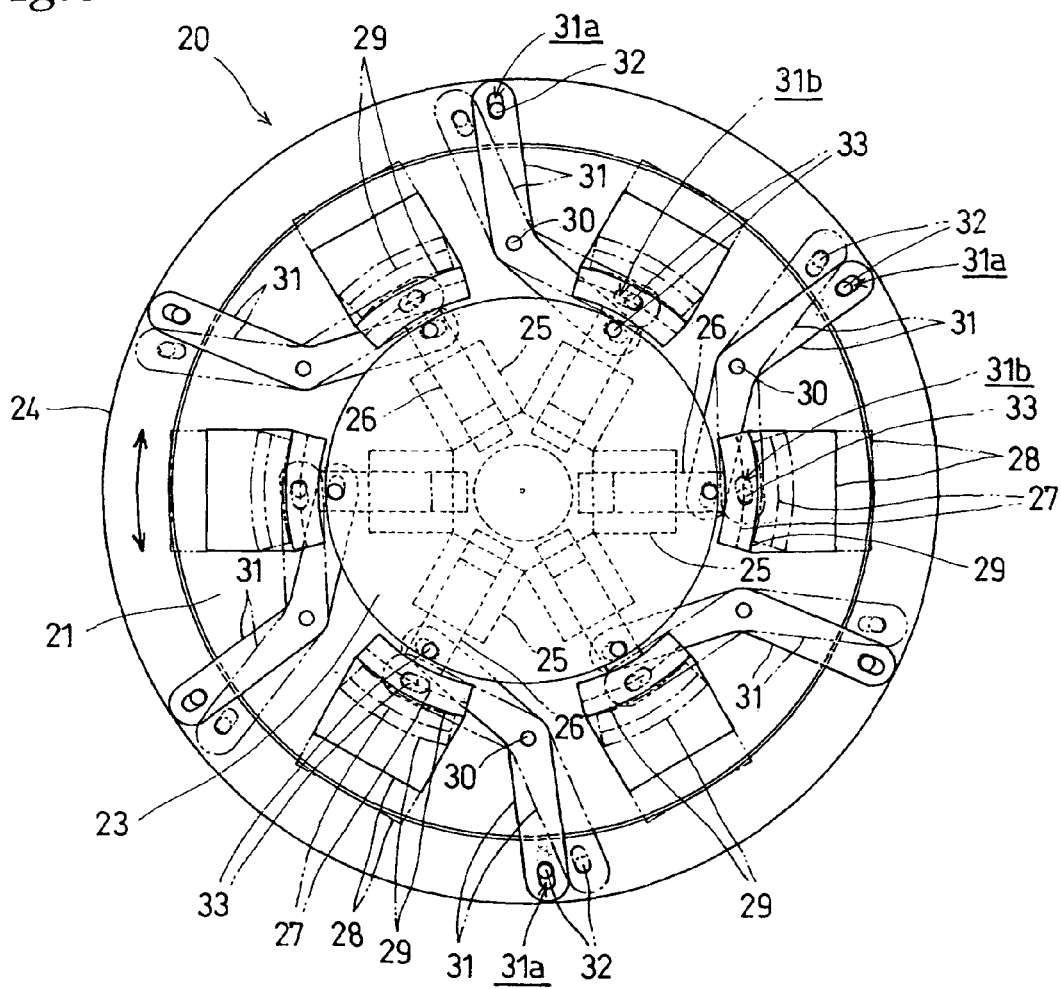
FIG. 5 is a bottom view of the upper tire bead correcting unit.

Referring to FIGS. 4 and 5, the upper tire bead correcting unit 20 included in the vertical loader 5 includes an upper disk 21 held by the swing bar 7, a center shaft 22 extending downward from the upper disk 21, a lower disk 23 of a reduced diameter attached to the lower end of the center shaft 22, and a rotary ring 24 put on the upper disk 21 so as to turn relative to the upper disk 21.

The rotary ring 24 is driven for turning by a pneumatic rotary actuator, not shown, or the like supported on, for example, the upper disk 21.

Guide members 25 are arranged on the upper surface of the lower disk 23 at equal angular intervals so as to extend radially from the center shaft 22 and is fixed to the lower disk 23. Six sliding bars 26 are guided for sliding in radial directions by the guide members 25, respectively. Cylindrical segments 27 are formed by dividing a cylinder along radial planes arranged at equal angular intervals about the axis of the cylinder. Upper ends of the cylindrical segments 27 are attached to the radially outer ends of the sliding bars 26, respectively. The cylindrical segments 27 extend downward around the circumference of the lower disk 23.

A horizontal flange 28 extends radially outward from a middle part of each cylindrical segment 27. A lower end part of each cylindrical segment 27 is bulged radially outward to form an engaging part or stopper 29.

Figure 6:
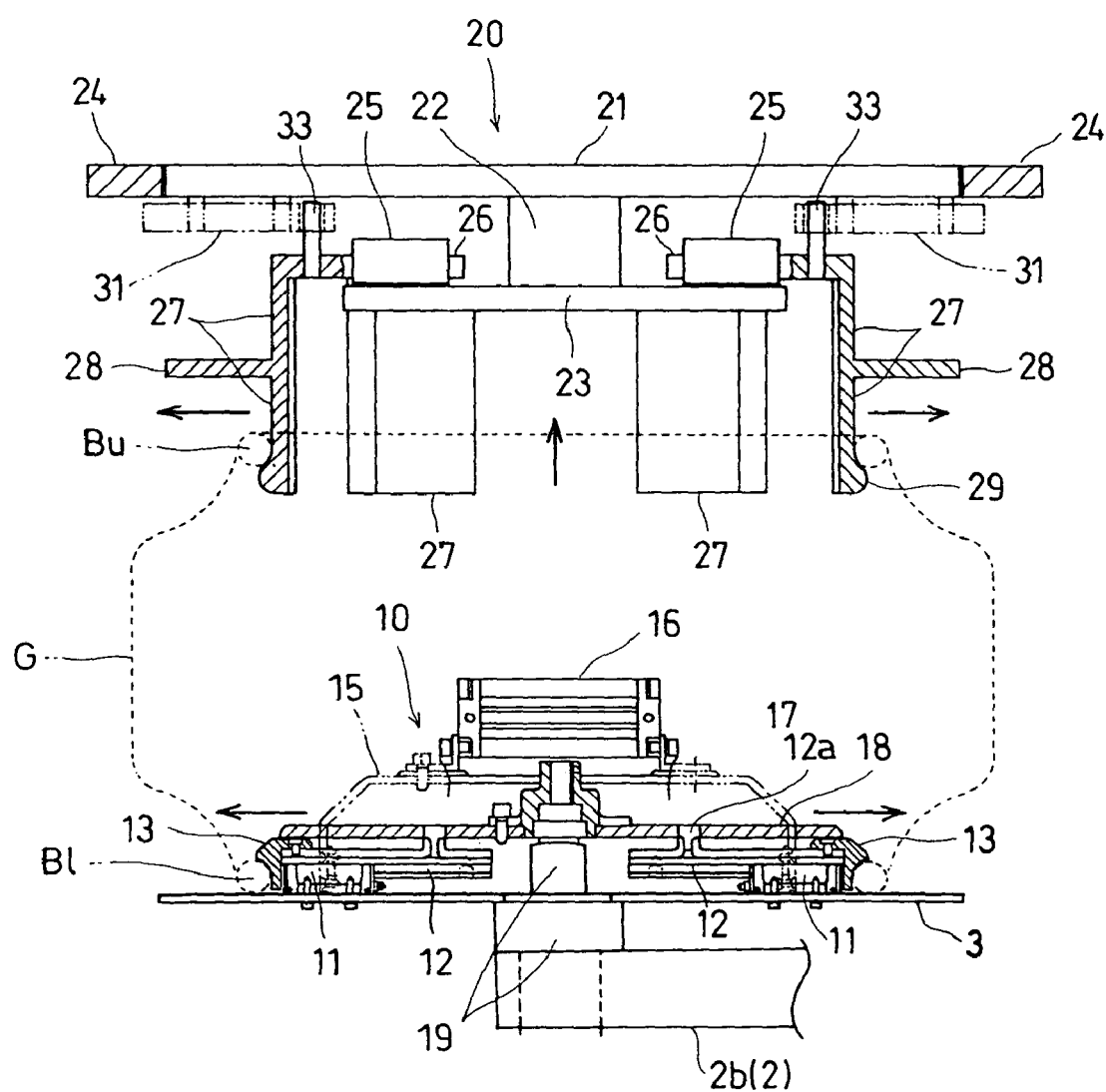
FIG. 6 is a side elevation of the lower tire bead correcting unit shown in combination with a green tire.

As shown in FIG. 6, the stoppers 29 of the six cylindrical segments 27 can engage with the inner side of an upper tire bead Bu of the green tire G supported in horizontal attitude.

Six pivotal pins 30 are arranged at equal angular intervals on a circle of a predetermined diameter on the lower surface of the upper disk 21 so as to extend downward. Each of bent levers 31 has a bend and outer and inner arms extending from the bend at an angle to each other. Each pivotal pin 30 supports the lever 31 at the bend thereof. The arms of the lever 31 extend horizontally in a space between the upper disk 21 and the lower disk 23. The levers 31 can turn about vertical axes, respectively, in the space between the upper disk 21 and the lower disk 23.

Each of the outer arms is provided in its free end part with a slot 31a. Pins 32 projecting from the lower surface of the rotary ring 24 are slidably engaged in the slots 31a of the outer arms of the levers 31, respectively.

Each of the inner arms is provided in its free end part with a slot 31b. Pins 33 projecting from the sliding bars 26 are slidably engaged in the slots 31b of the inner arms of the levers 31, respectively.

The pins 32 engaged in the slots 31a of the outer arms of the levers 31 turn the levers 31 on the pivotal pins 30 when the rotary ring 24 is turned. Consequently, the pins 33 engaged in the slots 31b of the inner arms of the levers 31 move the sliding bars 26 holding the cylindrical segments 27 in radial directions.

As shown in FIG. 5, the linkages respectively for moving the six cylindrical segments 27 are the same in construction. The six cylindrical segments 27 are always on the same circle. The six cylindrical segments 27 are moved in unison in radial directions by turning the rotary ring 24 and, consequently, the diameter of the circle on which the six cylindrical segments are arranged increases or decreases.

The rotary ring 24, the pins 32 and 33 and the bent levers 31 constitute a driving means for driving the cylindrical segments 27. The rotary ring 24, the pins 32 and 33 and the bent levers 31 constitute a second pressing member moving means.

A shape correcting procedure to be carried out by the thus constructed shape correcting apparatus will be described.

A green tire G delivered to the swivel support device 2 disposed at the green tire feed position in front of the vulcanizer 1 is placed in horizontal attitude on one of the three green tire support tables 3 of the swivel support device 2.

The eight pressing members 13 of the lower tire bead correcting unit 10 combined with the green tire support table 3 are on a circle of a reduced diameter before the green tire G is placed on the green tire support table 3. The annular green tire G is placed on the green tire support table 3 coaxially with the green tire support table 3 so as to surround the lower tire bead correcting unit 10.

The rotary actuator 16 of the lower tire bead correcting unit 10 is driven to move the eight pressing members 13 attached to the outer ends of the sliding bars 12 simultaneously in radially outward directions. Then, the eight pressing members 13 are engaged with the inner side of the lower tire bead Bl of the green tire G placed on the green tire support table 3 to hold the green tire G fixedly in place. The eight pressing members 13 are thus moved so as to become contiguous with a circle of a predetermined diameter to shape the lower tire bead Bl of the green tire G in a completely round shape of a predetermined diameter.

The swivel support device 2 is turned so as to locate the green tire G near the vulcanizer 1 to feed the green tire G to the vulcanizer 1.

Then, the upper tire bead correcting unit 20 suspended from the free end part of the swing bar 7 of the vertical loader 5 is located directly above the green tire G in alignment with the green tire G. Then, the upper tire bead correcting unit 20 is lowered to insert the stoppers 29 formed at the lower ends of the six cylindrical segments 27 arranged on a circle of a reduced diameter in a space surrounded by the upper tire bead Bu of the green tire G.

Then, the rotary ring 24 is turned to bring the six cylindrical segments 27 in unison into contact with the inner side of the upper tire bead Bu of the green tire G by simultaneously moving the six cylindrical segments 27 in radially outward directions.

Subsequently, the rotary ring 24 is turned further to move the cylindrical segments 27 so as to become contiguous with a circle of a predetermined diameter to shape the upper tire bead Bu of the green tire G in a completely round shape of a predetermined diameter.

At substantially the same time, the vertical loader 5 raises the upper tire bead correcting unit 20 to bring the stoppers 29 formed at the lower ends of the cylindrical segments 27 into engagement with the upper tire bead Bu. Then, the upper tire bead correcting unit 20 is raised by a predetermined distance to move the upper tire bead Bu engaged with the six stoppers 29 of the upper tire bead correcting unit 20 axially upward relative to the lower tire bead Bl fixedly held in position by the eight pressing members 13 of the lower tire bead correcting unit 10 to adjust the axial distance between the lower tire bead Bl and the upper tire bead Bu to a predetermined axial bead spacing B.

Thus the upper tire bead Bu and the lower tire bead Bl are shaped into a completely round shape of the predetermined diameter and the axial bead spacing (the axial distance between the upper tire bead Bu and the lower tire bead Bl) is corrected.

After the completion of such a correcting operation, the eight pressing members 13 of the lower tire bead correcting unit 10 are moved radially inward to release the lower tire bead Bl. Subsequently, the vertical loader 5 lifts up the upper tire bead correcting unit 20 to lift up the green tire G held by the six stoppers 29 of the upper tire bead correcting unit 20 in engagement with the upper tire bead Bu. The vertical loader 5 carries upper tire bead correcting unit 20 holding the green tire G onto the vulcanizer 1 and then, the upper tire bead correcting unit 20 releases the green tire G to subject the green tire G to vulcanization.

The green tire G is thus vulcanized by the vulcanizer 1. The upper tire bead correcting unit 20 is moved after releasing the green tire G to take the next green tire G to be vulcanized.

The lower tire bead correcting unit 10 combined with the green tire support plate 3 and the upper tire bead correcting unit combined with the vertical loader 5 shape the tire beads Bu and Bl of the green tire G into a completely round shape and adjust the axial distance between the tire beads Bu and Bl to the predetermined axial bead spacing B. Thus the shape of the green tire G can be efficiently corrected and a tire of high quality can be obtained by vulcanizing the green tire G.

Comparative measurements were made between the dimensions of a tire obtained by vulcanizing a green tire G corrected by the shape correcting apparatus of the present invention and having an upper tire bead Bu and a lower tire bead Bl correctly shaped in a completely round shape and the axial distance between the tire beads Bu and Bl equal to the predetermined axial bead spacing B and those of a tire obtained by vulcanizing a green tire G having an upper tire bead Bu and a lower tire bead Bl correctly shaped in a completely round shape without adjusting the axial length between the opposite tire beads. The measurements were made to comparatively examining the uniformity of those tires. The following are the results of examination.

The radial force variation (RFV) in the tire obtained by vulcanizing the green tire G having a correct axial bead spacing was better by about 4.5% than that in the tire obtained by vulcanizing the green tire G having an uncorrected axial bead spacing. The correction of the shape of the green tire G made according to the invention improved the standard deviation a of RFV by about 10%.

The lateral force variation (LFV) in the tire obtained by vulcanizing the green tire G having a correct axial bead spacing was better by about 14% than that in the tire obtained by vulcanizing the green tire G having an uncorrected axial bead spacing. The correction of the shape of the green tire G made according to the invention improved the standard deviation σ of LFV by about 21%.

Figure 7:
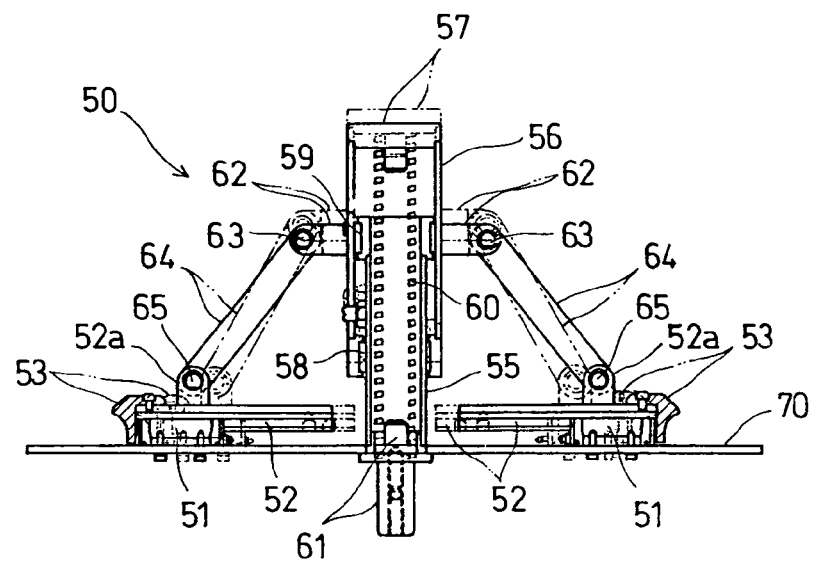
FIG. 7 is a partly sectional side elevation of a lower tire bead correcting unit included in a shape correcting apparatus in a second embodiment of the present invention.
Figure 8:
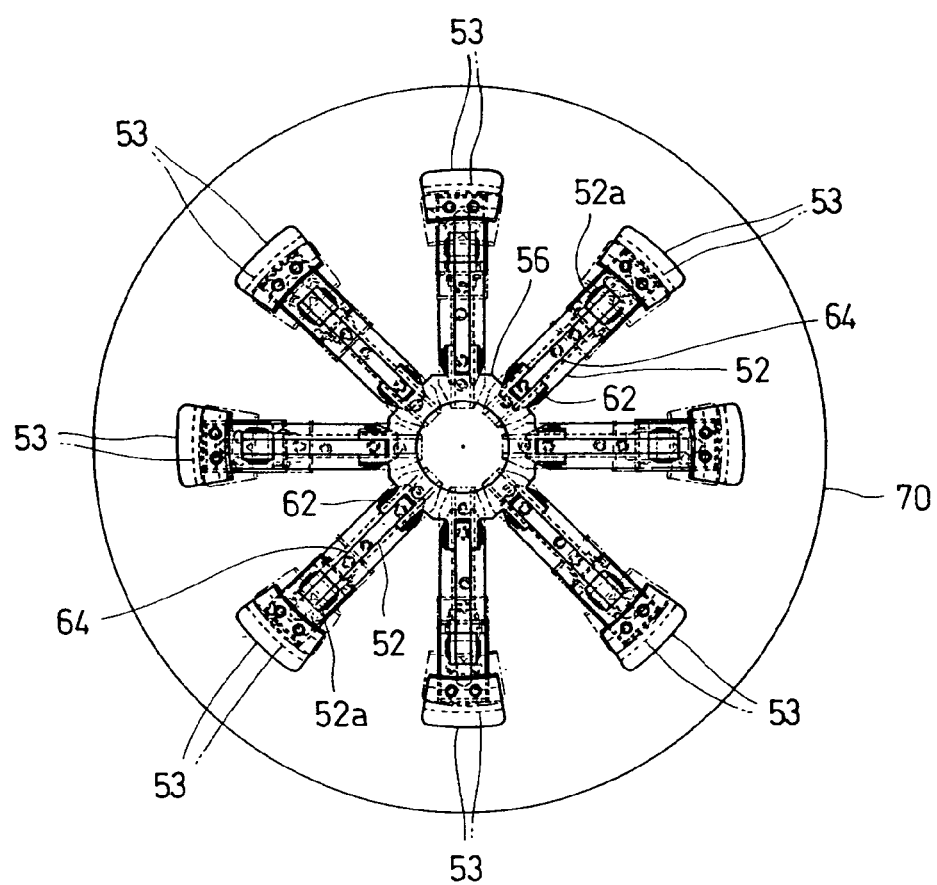
FIG. 8 is a top view of the lower tire bead correcting unit shown in FIG. 7.

A lower tire bead correcting unit 50 included in a shape correcting apparatus in a second embodiment of the present invention will be described with reference to FIGS. 7 to 9.

Radial guide members 51 are arranged at angular intervals on and fixed to a green tire support table 70. For example, the guide members 51 guide eight sliding bars 52 for sliding movement.

Pressing members 53 are attached to the radially outer ends of the sliding bars 52, respectively. The pressing members 53 have a shape resembling a circular arc in a plane and an L-shaped cross section. The pressing members 13 can be moved radially outward to bring the pressing members 13 into engagement with the inner side of a lower tire bead Bl of a green tire G held in horizontal attitude.

An inner cylinder 55 is set upright on the central part of the green tire support table 70. An outer cylinder 56 is put coaxially on the inner cylinder 55. A closing member 57 closes the open upper end of the outer cylinder 56. A linear bearing 58 is placed between the open lower end of the outer cylinder 56 and the inner cylinder 55 inserted in the outer cylinder 56. The linear bearing 58 allows the outer cylinder 56 to move axially relative to the inner cylinder 55 and seals the space between the inner cylinder 55 and the outer cylinder 56 in an airtight fashion. A linear bearing 59 is placed between the upper end of the inner cylinder 55 and the outer cylinder 56.

The outer cylinder 56 is axially movable relative to the inner cylinder 55. The inner spaces within the inner cylinder 55 and the outer cylinder 56 are sealed and isolated from the ambience.

An exhaust pipe 61 is connected to an opening formed in the central part of the green tire support table 70 serving as the bottom of the inner cylinder 55 to connect the interior spaces of the inner cylinder 55 and the outer cylinder 56 to a pressure reducing circuit.

A spring 60 is extended between the bottom of the inner cylinder 55 connected to the exhaust pipe 61 and the closing member 57 attached to the upper end of the outer cylinder 56 to push the outer cylinder 56 upward.

The outer cylinder 56 held at an upper position by the resilience of the spring 60 moves downward when the pressure in the interior of the outer cylinder 56 is reduced.

For example, eight brackets 62 are attached to a middle part of the outer surface of the outer cylinder 56 so as to project radially from the outer cylinder 56 and are connected to the sliding bars 52 by links 64, respectively. Each link 64 has one end pivotally connected to the bracket 62 by a pin 63 and the other end pivotally connected to a lug 52a formed in the sliding bar 52 by a pin 65.

In an initial state, the outer cylinder 56 is held at its upper end position and the eight sliding bars 52 are pulled to positions near the center of the green tire support table 70 by the links 64. Consequently, the pressing members 53 attached to the outer ends of the sliding bars 52 are on a circle of a minimum diameter.

When the outer cylinder 56 is lowered by reducing the pressure in the outer cylinder 56, the links 64 push the eight sliding bars 52 radially outward to move the pressing members 53 attached to the outer ends of the sliding bars in unison radially outward. Consequently, the pressing members 53 are arranged on a circle of an increased diameter.

When the interior of the outer cylinder 56 is connected to the atmosphere, the outer cylinder 56 is raised by the resilience of the spring 60 to retract the eight pressing members 53 radially inward.

Thus the eight pressing members 53 of the lower tire bead correcting unit 50 are engaged with the lower tire bead Bl of the green tire G placed on the green tire support table 70 to shape the lower tire bead Bl in a completely round shape of a predetermined diameter.

Figure 9:
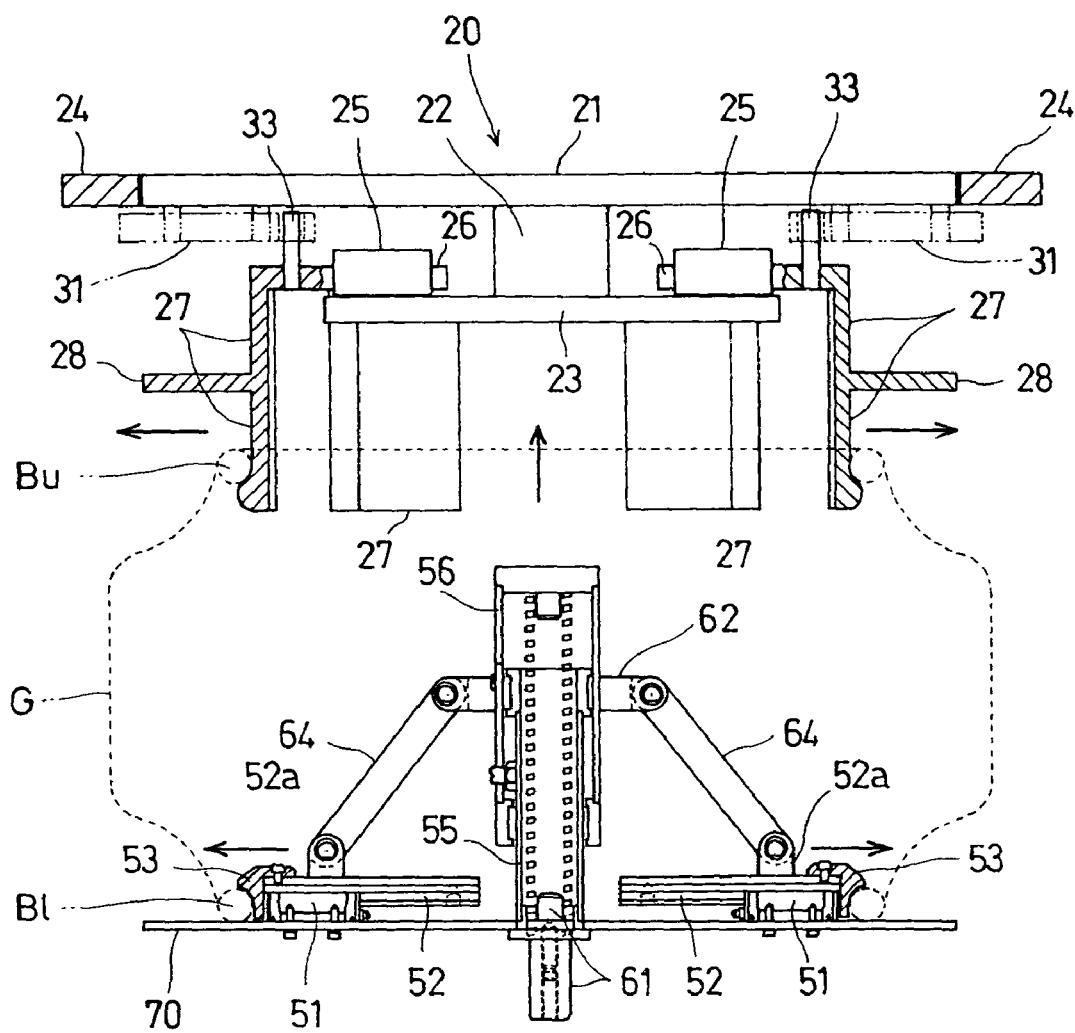
FIG. 9 is a side elevation of the lower tire bead correcting unit shown in combination with a green tire.

Then, as shown in FIG. 9, an upper tire bead correcting unit 20, which is the same in construction as the upper tire bead correcting unit 20 of the shape correcting apparatus in the first embodiment, suspended from a vertical loader 5 corrects the shape of the upper tire bead Bu of the green tire. At the same time, the upper tire bead correcting unit 20 is raised to adjust the axial distance between the upper tire bead Bu and the lower tire bead Bl of the green tire G to a predetermined axial bead spacing.

The shape correcting apparatus in the second embodiment including the lower tire bead correcting unit 50, similarly to the shape correcting apparatus in the first embodiment, can correctly shape the green tire G efficiently and a tire of high quality can be obtained by vulcanizing the green tire G correctly shaped by the shape correcting apparatus in the second embodiment.

The shape correcting apparatus in the second embodiment can adjust the axial distance between the opposite tire beads to the predetermined axial bead spacing such that the effect of the shape correcting apparatus in the second embodiment on the improvement of the uniformity of a tire obtained by vulcanizing the green tire indicated by RFV and LFV is equivalent to that of the shape correcting apparatus in the first embodiment.

Although the upper tire bead correcting unit is moved vertically relative to the lower tire bead correcting unit in the foregoing embodiments to adjust the axial bead spacing of the green tire G, the lower tire bead correcting unit may be vertically moved relative to the upper tire bead correcting unit or both the upper and the lower tire bead correcting unit may be vertically moved relative to each other for the same purpose.

The shape correcting apparatus of the present invention is applicable to correcting shapes of green tires of various sizes.

The invention claimed is:

1. A method of correcting the shape of a green tire, said method comprising the steps of:
   placing the green tire on a green tire support table, provided with a lower tire bead correcting unit attached thereon, at a predetermined position in horizontal attitude so as to surround the lower tire bead correcting unit;
   engaging a plurality of radially movable pressing members included in the lower tire bead correcting unit and arranged on a circle coaxial with the lower tire bead correcting unit with a lower tire bead of the green tire placed on the green tire support table;
   inserting an upper tire bead correcting unit inside an upper tire bead of the green tire placed on the green tire support table;
   engaging a plurality of radially movable pressing members included in the upper tire bead correcting unit and arranged on a circle coaxial with the upper tire bead correcting unit with the upper tire bead of the green tire placed on the green tire support table;
   moving the plurality of pressing members included in the lower tire bead correcting unit radially outward to shape the lower tire bead into a completely round shape of a predetermined diameter while the green tire is supported on the green tire support table;
   moving the plurality of pressing members included in the upper tire bead correcting unit radially outward to shape the upper tire bead into a completely round shape of a predetermined diameter; and
   vertically moving at least either of the lower and the upper tire bead correcting unit relative to the other to adjust an axial distance between the upper and the lower tire bead to a predetermined axial bead spacing.

2. The method according to claim 1, wherein the upper tire bead correcting unit is placed inside the green tire placed on the green tire support table by turning and vertically moving the upper tire bead correcting unit.

3. The method according to claim 1, wherein the plurality of radially movable pressing members included in the lower tire bead correcting unit are engaged with the lower tire bead of the green tire prior to inserting the upper tire bead correcting unit inside the upper tire bead of the green tire.

4. An apparatus for correcting the shape of a green tire, comprising:
   a green tire support table for supporting a green tire thereon in horizontal attitude;
   a lower tire bead correcting unit including a plurality of radially movable first pressing members attached to the green tire support table on a circle coaxial with the green tire support table and a first pressing member moving means for pressing a lower tire bead of the green tire radially outward by moving the first pressing members radially outward to shape the lower tire bead in a completely round shape of a predetermined diameter;
   an upper tire bead correcting unit including a plurality of radially movable second pressing members arranged on a circle and a second pressing member moving means for pressing an upper tire bead of the green tire placed on the green tire support table radially outward by moving the second pressing members radially outward to shape the upper tire bead in a completely round shape of a predetermined diameter; and
   lifting means for vertically moving at least either of the lower and the upper tire bead correcting unit relative to the other to adjust an axial distance between the upper and the lower tire bead to a predetermined axial bead spacing.

5. The apparatus according to claim 4, wherein the first pressing member moving means includes a plurality of sliding members respectively holding the first pressing members at radially outer ends thereof for sliding in radial directions, and a driving means for moving the sliding members radially outward and inward such that all the pressing members are always on one and the same circle.

6. The apparatus according to claim 5, wherein the sliding members are sliding bars extended in radial directions, respectively.

7. The apparatus according to claim 5, wherein the driving means for moving the sliding members radially includes projections formed respectively on the sliding members; a cam disk provided with spiral slots in which the projections on the sliding members are engaged, respectively, and supported for turning about the center axis of the lower tire bead correcting unit; and an actuator for turning the cam disk.

8. The apparatus according to claim 5, wherein the driving means for moving the sliding members in radial directions includes a stretchable tubular structure set upright on the green tire support table in alignment with a vertical center axis of the green tire support table, and links each having one end connected to the stretchable tubular structure and the other end connected to the sliding member for radially moving the sliding members according to variation of axial size of the stretchable tubular structure.

9. The apparatus according to claim 4, wherein the second pressing member moving means includes a plurality of segments respectively holding the second pressing members at radially outer ends thereof for moving in radial directions, and a driving means for moving the segments radially outward and inward such that the pressing members are always on one and the same circle.

10. The apparatus according to claim 9, wherein the segments are cylindrical segments formed by dividing a cylinder along radial planes arranged at equal angular intervals about an axis of the cylinder.

11. The apparatus according to claim 9, wherein the upper tire bead correcting means includes an upper disk and a lower disk parallel to the upper disk; the driving means for radially moving the segments includes the upper disk, an annular member put on the upper disk so as to surround the upper disk for turning movement about the upper disk; the driving means for radially moving the segments includes bent levers each disposed so as to extend along a lower surface of the upper disk, having a bend, an outer arm extending from the bend and provided with a slot in a free end part thereof and an inner arm extending from the bend at an angle to the outer arm, and pivotally supported on the upper disk by its bend, first pins attached to the upper disk and engaged in the slots of the outer arms of the bent levers, respectively, and second pins attached to the segments and engaged in the slots of the inner arms of the bent levers, respectively.

12. The apparatus according to claim 11, wherein guide members for guiding the segments for radial movement are fixed to the lower disk.

13. The apparatus according to claim 4, wherein the lifting means for correcting the axial distance between the upper and the lower tire bead includes a vertically stretchable, rotary shaft disposed adjacent to the green tire support table, and a swing bar horizontally extending from the rotary shaft and holding the upper tire bead correcting unit on a free end part thereof.

* * * * *